STORAGE OF ELECTRICAL INFORMATION

Filed June 11, 1957 3 Sheets-Sheet 1

Inventor
E.P.G.WRIGHT - D.S.RIDLER -
A.D.ODELL
By Robert Harding
Attorney

Dec. 18, 1962 E. P. G. WRIGHT ET AL 3,069,660

STORAGE OF ELECTRICAL INFORMATION

Filed June 11, 1957

3 Sheets-Sheet 2

Inventor
E. P. G. WRIGHT - D. S. RIDLER
A. D. ODELL
By Robert Harding Jr.
Attorney Inventor
E.P.G.WRIGHT - D.S.RIDLER
A.D.ODELL
By Robert Harding Jr.
Attorney 3,069,660

STORAGE OF ELECTRICAL INFORMATION

Esmond Philip Goodwin Wright, Desmond Sydney Ridler, and Alexander Douglas Odell, all of London, England, assignors to International Standard Electric Corporation, New York, N.Y.

Filed June 11, 1957, Ser. No. 664,957
Claims priority, application Great Britain June 14, 1956
8 Claims. (Cl. 340—173)

Figures 1A, 1B:
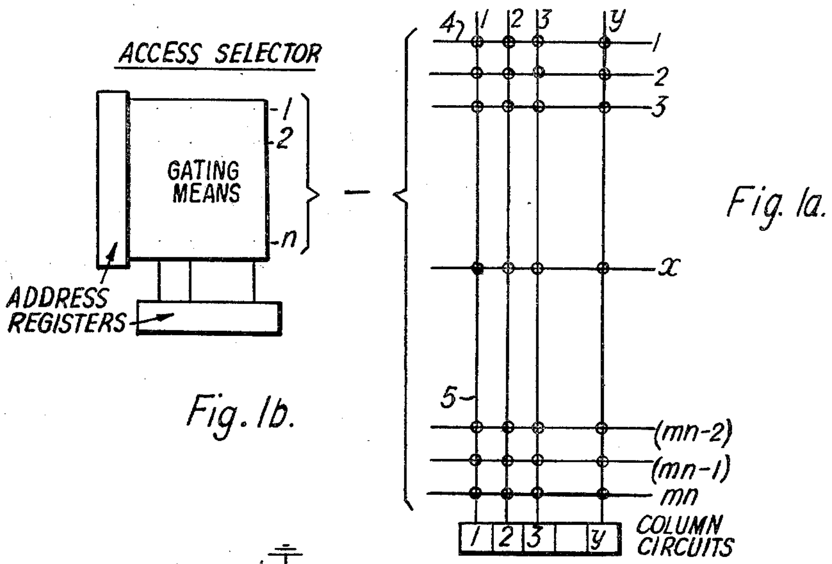

The present invention relates to intelligence storage equipment, and especially to such equipment in which the intelligence is stored in individual "ferric" cells.

The term "ferric cell" means an individual cell of a ferro-magnetic or ferro-electric material in which an intelligence bit may be stored by setting the cell to either one of two stable states. Examples of "ferric" cells are individual toroidal cores of ferromagnetic material, individual storage cells formed by the material surrounding holes in a plate or block of ferro-magnetic material, and individual ferro-electric capacitors.

These "ferric" cells may be combined to form a register for a desired intelligence pattern composed of binary "0" and "1" intelligence bits. In reading out the intelligence pattern from such register, its cells will be reset to initial state and the intelligence erased. It is desired to be able to read out the intelligence and yet retain it or restore it to the register for further use.

According to the subject invention, a unique arrangement is provided for the entry, storage, reading and rewriting or recirculation of any selected intelligence pattern in a register or store composed of "ferric" cells. The invention provides for addressing a store for "ferric" cells with a cyclic pulse pattern to cause the store to produce an output pattern of sequential pulses representative of the stored intelligence; means are provided to rewrite the information originally in the store in the same order. According to the invention, the cyclic control pattern of pulses with which the store of cells is addressed includes alternate read and write-enabling pulses, a read pulse and write-enabling pulse being applied in succession at each address cycle interval, with the read pulse causing a cell if in a particular binary value state to reverse its state and read out this binary value and with the following write-enabling pulse write this binary value into a successive cell. The invention also includes means for retarding the circulation of the intelligence bits by one or more address cycle steps or intervals, means also being provided for by-passing the retarding means.

The invention also contemplates a coordinate grouping of the cells in rows and columns, with the rows to be addressed sequentially with the read-write pulses.

It is understood that no positional limitation is to be attached to the terms "row" and "column," these terms being merely used to denote the arrangement of the cells in crossing directions.

According to the present invention there is providied intelligence storage equipment which comprises a group of "ferric" cells in each of which an intelligence bit may be stored by setting said cell to either one of two stable states, the equipment also comprising a temporary storage circuit common to the group of cells, in combination with common selection means which selects said cells sequentially in such a way that on each selection of one of said cells the bit which is stored therein is inserted in said circuit and a bit received by the circuit from a previously selected cell is extracted from the circuit and entered into the presently selected cell, whereby a pattern of intelligence stored in said cells may be maintained in circulation therein, the equipment further including an input to said cells over which intelligence to be stored therein is received, and an output from said cells over which the intelligence stored therein may be extracted.

According to the present invention there is further provided intelligence storage equipment which comprises a co-ordinate array of "ferric" cells in each of which an intelligence bit may be stored by setting said cell to either one of two stable states, common selection means for said array which selects the rows of said array successively in such a way that when a row of cells is selected, all of the bits stored therein are read therefrom and stored in temporary storage devices associated respectively with the columns of cells following which the bits in the temporary storage device associated with all the columns except the last are advanced to next column cells of the row under selection whereas the bit in the last column temporary storage device is inserted in the first column cell of the next selected row, whereby a pattern of intelligence stored in said co-ordinate array of "ferric" cells may be maintained in circulation therein, the equipment also including an input to said coordinate array over which intelligence to be stored therein is received, and an output from said co-ordinate array over which intelligence stored therein may be extracted.

The invention will now be described with reference to the drawings accompanying the present specification.

Figure 2:
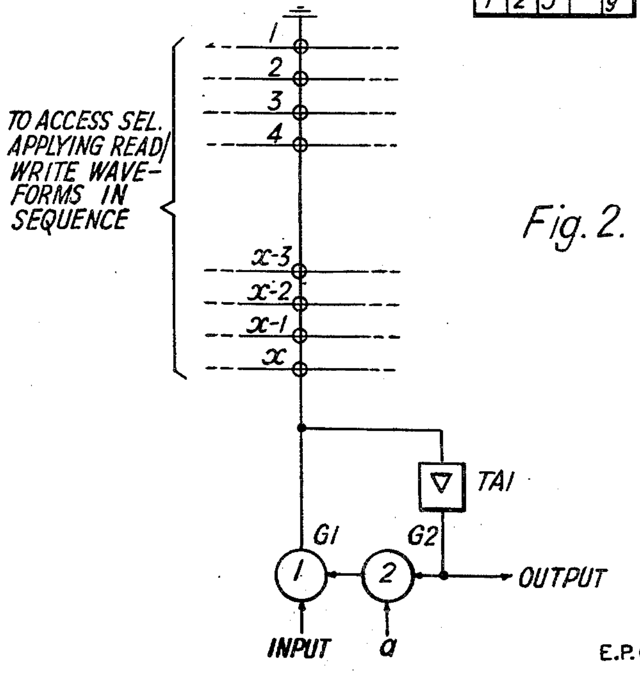
Figure 3:
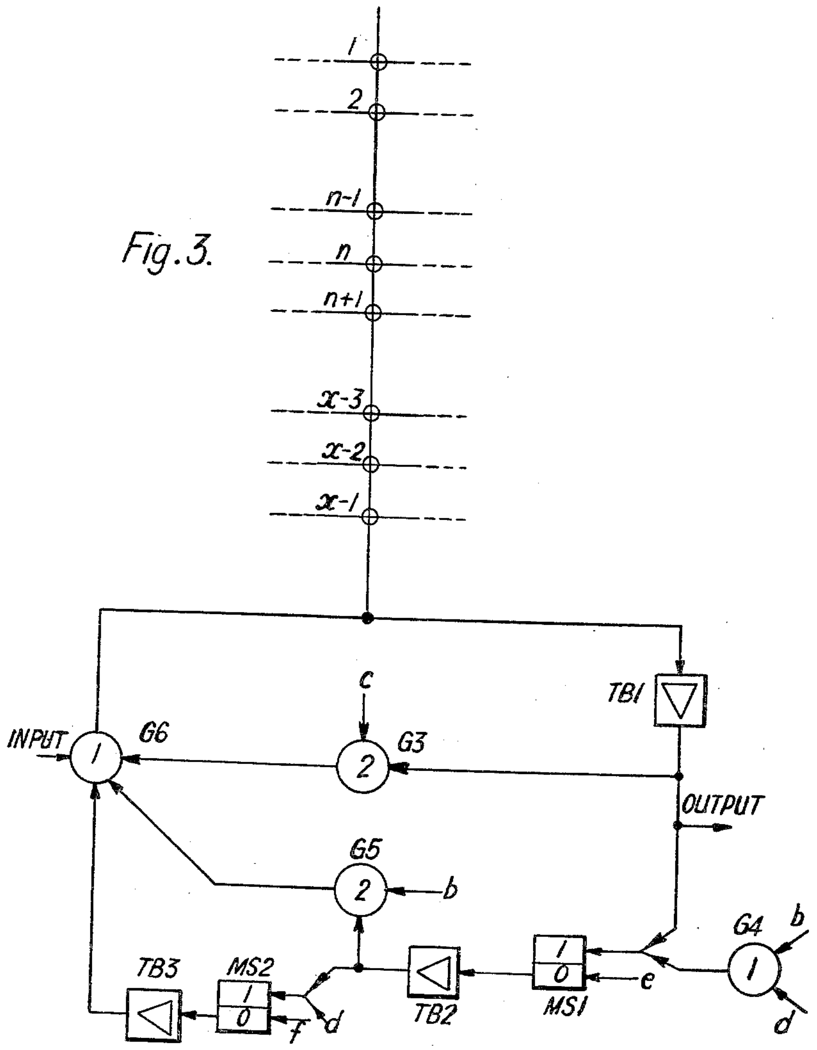
Figures 4, 5, 6:
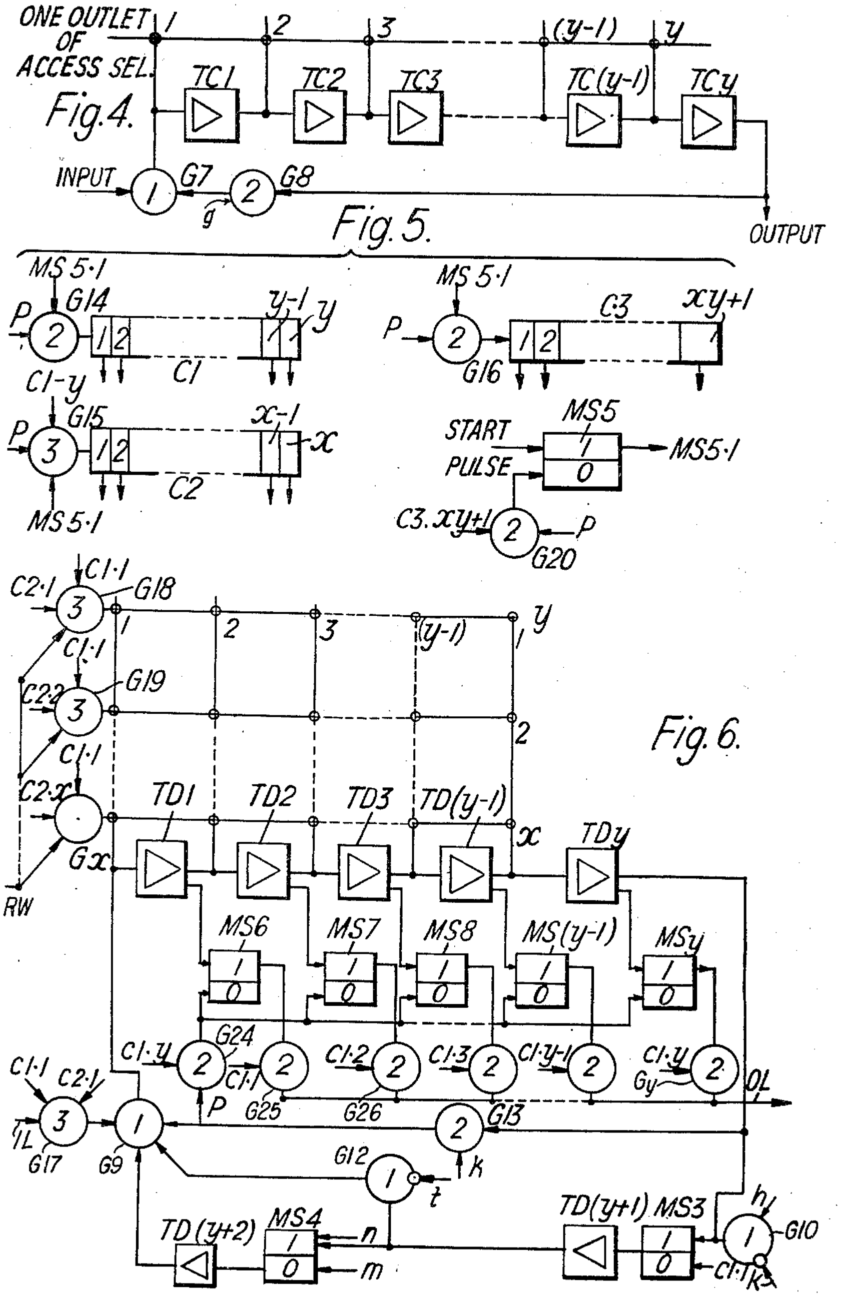

FIG. 1*a* shows schematically a magnetic store,

FIG. 1*b* diagrammatically shows an access selector for a FIG. 1*a* type of store, FIG. 2 shows a portion of a column of the store and the reading and writing circuit for the column, FIG. 3 shows a circuit for circulation and for left or right shift of information stored in a column, FIG. 4 shows a portion of a row of the store and the reading and writing circuit for the row, FIG. 5 shows, diagrammatically, ring counters, and FIG. 6 shows, diagrammatically, part of an intelligence storage equipment.

The magnetic store shown in FIG. 1*a* preferably comprises a number of ferrite blocks 1, 2, . . . *mn* having a number of holes therein, as described in U.S. application Ser. No. 492,982, filed March 8, 1955, now U.S. Patent No. 2,952,840, the material surrounding each hole in the blocks forming a digit cell. It will be understood, however, that the magnetic store could equally well comprise conventional toroids of ferrite material each serving as a digit cell.

Each block is threaded with a wire such as 4 which passes through all its holes, this wire being called the row wire. The blocks are arranged one above the other, and a set of wires such as 5, called the column wires, is threaded through like holes in all the blocks.

Each cell is normally at "0." When it is required to write "1" into any cell, then half write pulses are applied to the appropriate row and column wires. Each half write pulse alone is insufficient to trigger a cell over a "1," so that the only cell that will be triggered to "1" is the cell at the cross-over point of the row and column wires.

To read out, a negative pulse is applied over the row wire, and this pulse is sufficient to reset a cell that is in a "1" state to "0," and a cell that was at "1" will give a substantial output pulse on its column wire, whereas a cell that was "0" will only give a small pulse which is arranged to be ignored by the reading circuit connected to the column wire.

In reading out the information stored, it will be seen that the information is destroyed, i.e. all the cells in "1" state are returned to "0." This means that it is necessary to re-record the information. This is achieved by following the read pulse applied over the row wire with a half write pulse, together with a half write pulse on the column wire. This will be explained in more detail later on.

Read and half write pulses are applied to the row wires of the store by the access selector diagrammatically shown in FIG. 1*b*. This access selector includes a pair of address registers and suitable gating means for selecting row wires of a store such as shown in FIG. 1a to receive operating signals, the outlets 1, 2, . . . *n* of the gating means being connectible to the row wires 4 of the blocks 1, 2, . . . *mn* of the FIG. 1*a* store. The address registers and access selector are more fully shown in FIGS. 5 and 6.

The magnetic store can store information serially in a column by addressing the access selector in any sequence which is repeated on successive cycles.

FIG. 2 shows a portion of a column comprising *x* cells to which a cyclic wave pattern is applied by a FIG. 1*b* form of access selector. For purposes of the invention, this cyclic wave pattern consists of read-write wave forms, one per address cycle interval, each having a negative read pulse followed by a relatively positive half-write pulse. If the access selector waveforms are applied to the cells in the order 1, 2, 3, 4, . . . $(x-1)$, $x$, a serial number of $x$ bits timed in relation to the half write pulses of the access selector and applied to the column via the gate G1 may be written into the column, the first bit occupying cell 1, the second bit cell 2, and so on.

By repeating the addressing sequence of the access selector, its successively applied read pulses will cause the number to be read out serially as stored.

A trigger-amplifier TA1 produces a delayed half write pulse in response to a "1" signal from a storage cell, and may be as described in U.S. application Ser. No. 646,168 of March 12, 1957, now abandoned. By energising input *a* to gate G2, the number can be re-written in the column by being fed back into the column in coincidence with the half write pulses following the read pulses.

This arrangement will appear from the input and output to function in much the same way as a carrier track on a magnetic drum store, and if the access selector waveform is synchronised with a clock track on a magnetic drum, it will clearly be possible to use the drum store and magnetic store in co-operation.

FIG. 3 shows a circuit connected to a column comprising $(x-1)$ cells and which includes facilities for circulation and for left or right shift of information stored serially in the column. Trigger-amplifiers TB1–3 are each like TA1 already described, producing a delayed half write pulse in response to a "1" signal. MS1 and MS2 represent bi-stable devices which may be set to one or other state, and which are normally in the on-state corresponding to binary "0." Such a device may be set to its off-state, corresponding to binary "1," on application of a number of coincident pulses (in this case, two). The device then remains in this off-state and storing the applied "1" until the application of a further single pulse which restores the device to its on-state and in so doing causes an output pulse from the device. Such a device is described in the above-mentioned application No. 646,168.

During each operating period the access selector (not shown) takes $x$ steps although having only $(x-1)$ outlets connected to $(x-1)$ rows. The reason for this will be understood when the operation is considered.

In order to store information serially in the column, the access selector is cycled $x$ steps, e.g. $n$, $n+1$, $n+2$, . . . $n-1$, $n$, $n+1$, where $n$ is any integer less than $x$, and, while the access selector is stepping, the information comprising $x-1$, bits is applied serially to gate G6 in the correct time relationship to the half write pulses from the access selector. Thus the information is stored serially in the column. After the last bit of information is stored in cell $(x-1)$, the access selector completes its cycle of $x$ steps by addressing the row of the column in which the first bit of information was stored, and applies a read pulse thereto. During the $x$th step, either the *b* or *d* input to gate G4 is energised. Consequently the first bit of information is read from the column and is stored in MS1 via TB1, since MS1 is set to its off-state by the application of two coincident pulses, one from TB1, the other from G4. Thus the first information bit is stored in MS1 and the remainder in the column.

In order to circulate information for the purpose of reading it at the output without destroying it, the access selector is cycled $x$ steps. Input *e* to MS1 is energised in coincidence with each read pulse from the access selector, and input *b* to gates G4 and G5 is energised in coincidence with each half write pulse from the access selector. The information is read out from the column and follows the path TB1, MS1, TB2, G5 and G6. At TB1, a "1" signal will cause TB1 to produce a delayed half write pulse which is then stored in MS1 due to coincidence with the output pulse from gate G4. In coincidence with the next read pulse from the access selector this information bit will appear in the output from MS1 and cause a delayed half write pulse from TB2, and this half write pulse, via G5 and G6 will be re-stored in the column in the next cell to the one from which it was read, due to its coincidence with the half write pulse from the access selector. Thus each time the information is circulated each bit of information is shifted to the next storage position, although this is not apparent at the output since the access selector shifts its home position one step on each cycle.

In order to left shift information, stored during a previous cycle, the *b* inputs are disabled, the *c* input to gate G3 is energised and the access selector again cycled $x$ steps. As described above, in the last step of a complete access cycle, the first information bit is transferred from the column of cells to MS1. During normal circulation, this first information bit will be read out of MS1 during the first step of the next access cycle. Thus, in normal circulation, the first bit to appear in time during a cycle is the bit extracted from MS1. With the *b* inputs disabled and the *c* input energized, MS1 is by-passed and during the first step of the access cycle, the bit in MS1 is lost. Thus the information follows the path TB1, G3 and G6, and the first information bit to appear in time during a left shift cycle is not the first bit which appears during a normal circulation cycle and which is taken from MS1 but is the second information bit of the series of stored bits.

In order to right shift information, the *f* input to MS2 is energised in coincidence with the read pulses from the access selector, and the *d* input to MS2 and gate G4 is energised in coincidence with the half write pulses. The access selector is cycled $x$ steps. As is now clear, the information follows the path TB1, MS1, TB2, and then MS2, TB3 and G6. The storing and subsequent reading of a "1" signal at MS2 according to which inputs are energised is similar to that described with reference to MS1. The *f* input to MS2 is not energised for the reading out of the last information bit stored therein, and the information is fed back into the column one bit period later than in a normal circulation cycle, and the last bit of the previously stored series is lost in MS2.

Referring now to FIG. 4, information can be stored serially in any row of a magnetic store by addressing the access selector (not shown), according to the row address, as many times as there are bits to be stored (in FIG. 4, $y$ times), and applying the information serially to the gate G7 in coincidence with half write pulses from the access selector.

Each trigger amplifier TC1, 2, 3 . . . produces a delayed half write pulse on receipt of a "1" signal. Thus on the first half write pulse of a succession of read-write wave forms received by the row from the access selector, the first bit of information is written into cell 1. On the second addressing of the access selector to the row, the read pulse will read out the first bit of information stored in cell 1 and this will be applied to TC1. On the subsequent half write pulse from the access selector, the second bit of information will be written into cell 1, and the first bit of information will be written into cell 2. In this manner, successive addressing of the access selector to the row will cause information bits already stored to be each shifted to the next cell to the right in FIG. 4, and each externally applied bit of information to be written into cell 1. After the access selector has addressed the row $y$ times, the serial number of $y$ bits will be stored in the row from right to left.

The stored information can be fed to the output by repeating the addressing procedure, and re-stored by energising the $g$ input to gate G8.

In order to circulate information the access selector is addressed $y$ times, to right shift it is addressed once, and to left shift $(y-1)$ times.

Referring now to FIG. 5 three ring counters C1, C2, and C3 and a bistable device MS5 are shown diagrammatically in this figure. The ring counter C1 has $y$ stages with one output per stage. The input to the counter through which stepping pulses P are fed is controlled by a coincidence gate 14 having an input for the pulses P and an input from the bistable device MS5. The reception by C1 of a stepping pulse P, provided that the gate G14 is opened by MS5, causes the counter to step one stage and shift the output, e.g. from C1.1 to C1.2 etc. The ring counter C2 is similar to C1 and has $x$ stages, but is controlled by a coincidence gate G15 which requires the reception of the output C1.$y$ and MS5.1 to permit a pulse P to step the counter one stage to change the output e.g. from C2.1 to C2.2 etc. The ring counter C.3 is also similar to C1 and has $xy+1$ stages, its gate G16 being controlled in the same manner as the gate G14 of the counter C1.

The bistable device MS5 provides the output MS5.1 when in the state "1," into which state it goes on reception of a start pulse. The device enters the "0" state on reception of an output C3.$xy+1$ from the ring counter C3.

Assuming that the device MS.5 is put into the "1" state by a start pulse, that the counters C1, C2, and C3 are quiescent (or that they are at stages $y$, $x$, and $+1$ respectively), then the reception of a first stepping pulse P will cause counters C1 to C3 to go to stages 1. A second pulse P will cause counters C1 and C3 to go to stage 2, but counter C2 will not be stepped until after counter C1 has reached stage $y$ due to the action of gate G15. Thus only after every $y$th pulse can counter C2 be stepped one stage. After $(xy+1)$ pulses counters C1 and C2 will again be at stage 1 whilst counter C3 will be at the $xy+1$ stage. A further P pulse will not cause the counter to step unless a further start pulse is first applied to MS5 since it reverts to the "0" state when C3 gives the output $(xy+1)$.

FIG. 6 shows diagrammatically part of an intelligence storage equipment controlled by the counters C1 to C3. The equipment includes a matrix of cells arranged as described with reference to FIG. 1$a$. One end of each row is connected to a gate, i.e. row 1 is connected to a gate G18, row 2 to a gate G19 etc. and row $x$ to a gate G$x$. A time delay amplifier is connected between each pair of adjacent columns, a time delay amplifier TD1 being connected between columns 1 and 2, an amplifier TD2 between columns 2 and 3, etc. and a time delay amplifier TD$(y-1)$ between columns $y-1$ and $y$. Column $y$ is connected to a time delay amplifier TD$y$ the output of which is connected to a bistable device MS3. The device MS3 is arranged to be in either a state "0" or a state "1," and can be brought to state "1" by two coincident pulses, one from TD$y$ and one from a gate G10. The device can be returned to state "0" by the application of the output C1.1 from counter C1, and in being returned to state "0" an output pulse is generated. The gate G10 is arranged to pass a pulse when its input $h$ is present but only if an input $k$ is not present. The output of the device MS3 is connected to another time delay amplifier TD$(y+1)$ whose output is connected to a gate G12 and to the input of another bistable device MS4 similar to the device MS3. The gate G12 has an inhibiting input $t$ and an output connected to gate G9. An input of the gate G9 is connected, via a gate G13 opened by an input $k$, to the output of the time delay amplifier TD$y$.

Each of the time delay amplifiers TD1 to TD$y$ has an output connected to an input of a respective bistable device MS6 to MS$y$. An output pulse from one of these amplifiers causes the respective multi-stable device to enter a "1" state and give a continuous output. Each of the respective bistable devices MS6 to MS$y$ has an input connected in common to the output of a gate G24 controlled by inputs P and C1$y$ which, when coincident, return the bistable devices MS6 to MS$y$ to the "0" state. The output of each bistable device MS6 to MS$y$ is connected, via respective gates G25 to G$y$, to a common output lead OL. Each of the gates G25 to G$y$ is controlled by a respective output from the counter C1, the output C1.1 controlling G25, C1.2 controlling G26, etc. and C1.$y$ controlling gate G$y$.

Each of the gates G18 to G$x$, leading to rows 1 to $x$ of the store is controlled by outputs from the counters C1 and C2. The gate G18 is controlled by the outputs C1.1 and C2.1, the gate G19 by C1.1 and C2.2 and G$x$ by C1.1 and C2.$x$.

A gate G17 has an output connected to gate G9 and is opened by coincident outputs C1.1 and C2.1 of the counters C1 and C2. The input to the store is fed through the gate G17 via an input lead IL, in the form of half write pulses.

The equipment also includes means for feeding, or is arranged to be fed by, the series of stepping pulses, referred to as P pulses, at uniform intervals of time, and a series of read and half write pulses, referred to as RW wave forms. Each RW wave form is arranged to appear just after the end of a P pulse. The input $h$ to gate G10 is arranged to appear in synchronism with the half write pulses of the RW wave forms.

In order to store, a start pulse is applied to the bistable device MS5 (see FIG. 5) and P pulses are fed to the C1 to C3, whilst RW wave forms are fed to the gates G18 to G$x$. It will be assumed that the store is empty and that one bit "1" is to be stored. It will also be assumed that the first P pulse causes the counters C1 to C3 to enter state 1 (as previously explained) so that the counter C1 and C2 give the outputs C1.1 and C2.1. Thus the gate G18 to row 1 is opened and the following RW wave form is fed to row 1. The read pulse has no effect as the row (and store) is empty. The gate G17 is also opened by the outputs C1.1 and C2.1 from the counters, and the input, in form of a half write pulse is fed in synchronism with the first half write pulse of the first RW pulse via the gate G9 to column 1. Cell 1 of row 1 therefore stores the first bit entered.

The second P pulse causes counter (C1 and C3) to step, and hence causes gate G18 to close. No more bits can be entered into row 1 until counters 1 and 2 have returned to stage 1. This does not occur until after $xy$ P pulses have been fed to the counters, that is to say the $(xy+1)$th P pulse returns counters C1 and C2 to stage 1, but the $(xy+1)$th P pulse causes counter C3 to reach stage $xy+1$ and the output from this stage causes MS5 to return to the "0" state and so prevent the counters C1 and C2 from stepping until a second start pulse is applied to MS5. It will be appreciated that the $(xy+1)$th P pulse wires the counters C1, C2 and C3 to reach stages 1, 1, and $xy+1$ respectively, and that the first pulse after the second start pulse causes the counter C1 to step to stage 2.

When the counters C1 and C2 have reached stage 1 due to the $(xy+1)$th P pulse the gate G18 opens and the RW wave form is fed to row 1 again. Since cell 1 of row 1 stores a bit, the "1" bit is read by the read pulse and a pulse is fed to the time delay amplifier TD1 which delays the pulse for a period of time. This period of time is sufficient for the output of TD1, in the form of a half write pulse, to be fed to column 2 at the same time as the half write pulse (of the RW wave form which caused the bit to be read) reaches row 1, hence this cell 2 of row 1 now stores the bit.

If it is required to store a second bit, the input, in the form of a half write pulse, is fed via the gates G17 and G9 in the same manner as before, and the second bit is therefore stored in cell 1 of row 1 at the same time as the first bit is received by cell 2 of this row from TD1.

The cycle of events may then be repeated, the first bit entered being transferred from cell 2 of row 1 to cell 3 of row 1 and so on via the column circuits which include amplifiers TD2 etc.

When the first bit entered reaches cell $y$ of row 1, the next read pulse in row 1 causes an input to TD$y$. The output of TD$y$ in the form of a half write pulse is fed to the device MS3. The gate G10 passes the input $h$ thereto (in the form of half write pulses) in synchronism with the half write pulses of the RW wave form, to the device MS3. Thus MS3 receives two half write pulses and is brought to state "1," that is to say, it stores the first bit entered.

It will be appreciated that since the bit was transferred from the matrix to MS3 when counters C1 and C2 were at stage 1, i.e. gave outputs C1.1 and C2.1, the next occurrence of output C1.1 coincides with output C2.2.

Since output C1.1 of counter 1 is fed to the device MS3 to return it to the "0" state and send a read pulse to TD$(y+1)$, MS3 is read when gate G19 of row 2 is opened, since this gate opens on application thereto of outputs C1.1 and C2.2.

Thus the bit stored in the device of MS3 is transferred, via time delay amplifier TD$(y+1)$, gate G12 which is opened when input $t$ is absent, and gate G9 to cell 1 of row 2.

The bit is now transferred from cell to cell of row 2 in the same manner as it was transferred from cell to cell in row 1. But in this case the bit is transferred each time the counters C1 and C2 give outputs C1.1 and C2.2. As before, on reaching the last cell of the row, the bit is transferred via TD$y$ MS3, TD$(y+1)$ G12, and G9 to the next row, and so on till the bit is stored in cell $y$ of row $x$. The bit is then transferred, as before, to MS3 and thence to the first cell of row 1. This will be appreciated from the following consideration. The number of stepping pulses required to return all counters to stage 1 is $xy(xy+1)$. A bit is transferred from one storage position to the next every $xy$ pulses. Hence the number of pulses required to transfer a bit from cell 1 in row 1 to MS3 (via cell $y$ of row $x$) is $xy(xy+1)$. Thus counters C1 to C3 will be at stage 1 when the bit is read from MS3 and the bit will therefore be transferred to cell 1 of row 1 for the second time. Hence the bit will continue to be circulated.

So far only the method by which a single bit is entered into the store and circulated has been described. A second bit may, however, be stored and circulated in the same way as the first bit, the second bit being entered into the cell 1 of row 1 as the write pulse, which immediately follows the read pulse that transfers the first bit from cell 1 of row 1, appears on row 1. In the same way a third bit may be stored in the cell 1 of row 1 as the second bit is transferred therefrom.

Since the cells store $xy$ bits and MS3 stores one bit, the number of bits that can be stored is $xy+1$ bits. After $xy(xy+1)$ stepping pulses (or $xy$ start pulses) the first bit entered will be stored in MS3 (as explained) and the last bit that can be entered will be stored in cell 1 of row 1.

The method of reading the stored bits in the matrix and in the device MS3 will now be described.

Assuming that the matrix is full, that the device MS3 stores a bit, that C3 has reached stage $(xy+1)$ and hence C1 and C2 are at stage $y$ and $x$, and that the first bit entered was entered when C3 was at stage 1, then the first bit entered will be in MS3, the second bit entered will be in cell $y$ of row $x$ etc., and the last bit entered will be in cell 1 of row 1. Row 1 is read first; and then row 2 etc., and cell 1 gives its output over line OL before cell 2, and so on. This is brought about as follows: a start pulse is applied to MS5 and then a P pulse is applied to counters 1 to 3 stepping them all to stage 1. Thus counter C1 gives an output C1.1 and C2 gives an output C2.1. Thus gates G18 and G25 are opened. The RW wave form which follows the P pulse is, therefore, fed to row 1 only of the matrix. Therefore the bit stored in cell 1 of row 1 is read out and passes via the amplifier TD1, not only to cell 2 of row 1, as previously described, but also to the bi-stable device MS6 as well.

The device MS6 has the following operating characteristics. When in the "0" state, a pulse applied thereto from TD1 puts it into the "1" state to give a continuous output to gate G25. When in the "1" state a P pulse applied via the gate G24 puts it into the "0" state. The devices MS7 to MS$y$ have the same operating characteristics as MS6.

The output from TD1 puts the device MS6 into the "1" state. Since the gate G25 is still open the output from TD1 goes directly to the common output lead OL. However, the bit stored in cell 2 of row 1 is also read, and hence the device MS7 is also put into the "1" state, but in this case the output from MS7 is blocked by the gate G26. In the same way the outputs from MS8 to MS$y$ are also blocked. On the appearance of the next P pulse the counter C1 steps a stage and gives an output C1.2. The gate G26 is opened and the gate G25 closed. The output from MS7 is thus applied at C1.2 time to the common output lead. In the same way the outputs from MS8 to MS$y$ are fed in succession to the common output so that, in effect, the cells of row 1 are read in succession and bits stored are fed to the common output in succession.

Gates G$y$ and G24 are opened when counter C1 reaches stage $y$, so that the output from MS$y$ is fed to the common output prior to the appearance of the next P pulse which, via gate G24, puts all the devices MS6 to MS$y$ back to the "0" state. This next P pulse puts counter C1 to stage 1 and C2 to stage 2. Hence gate G19 of row 2 is opened and the bits stored in the cells of row 2 are then read successively in the same manner as row 1.

It should be remembered that the bit stored in MS3 (that is, in this case the first bit entered) is transferred to cell 1 of row 1 after row 1 has been read and before row 2 is read. When row $x$ is being read, counter C2 will be at stage $x$, and counter C1 will be stepping from stage to stage to open gates G25 to G$y$ in succession. When counter C1 reaches stage $y$, counter C3 will be at stage $xy$, hence the next P pulse to appear will step counters C1 and C2 to stage 1 and so open gate G18, but counter C3 will be stepped to stage $xy+1$, and, therefore return MS5 to the "0" state. Thus gates G14 and G15 of counters C1 and C2 will be closed, but gate G18 will be open. Row 1 will then be read, but since only the gate G25 of the readout gates is open at C1.1 time, then only the output from MS6 will be fed to the common output, that is, only the bit stored in cell 1 of row 1 will be read out to the common output OL. Hence the other bits stored in row 1 (i.e. the bits that have been read) will not be read out again until the counters resume operation following a new start pulse to MS5.

Provision is made for the left and right shifting of information.

It will be assumed that a bit is stored in MS3 and that this bit was the first bit entered into the matrix. That is C1 will be at stage $y$, C2 at $x$ and C3 at $(xy+1)$. If it is now desired to shift so that this bit is lost and so that all the other bits are retained in order, the gate G13 has a shift input $k$ applied thereto so that it is opened. The input $k$ is also applied to the gate G10 so that it is inhibited and no pulses are applied to MS3 in synchronism with the half write pulses of the RW wave forms. Further, the input $t$ is applied to gate 12 to close it.

If now a start pulse is applied to MS5 and a P pulse is then applied to the counters, the counters will all reach stage 1. The read pulse of the following RW wave form reads the bits stored in row 1 since the gate G18 is opened by outputs C1.1 and C2.2. The bit stored in cell $y$ of row 1 is read out via TD$y$ and, since the gate G13 is open, it passes via G9 to cell 1 of row 1. The bit stored in MS3 is extracted therefrom in response to the C1.1 output and fed via TD $(y+1)$ to gate G12, but since this gate has been closed by input $t$, the bit from MS3 is not rewritten into the matrix of cells and is discarded. Further, the bits passed via TD$y$ are not permitted to enter MS3 via gate G10 since this gate is closed. The gate G13 remains open and the gate G10 remains closed until the counters all return to stage 1. In order to shift again in the same manner, a start pulse is applied followed by a requisite number of P pulses so that all the rows are read and MS3 contains the second bit entered. The shift inputs $k$ and $l$ are then applied so that the bit in MS3 is lost in the same manner as before.

In order to shift information in the other direction, the bistable device MS4 is introduced into the circuit which the bits follow and acts as an additional storage position. The device MS4 operates in a similar manner to MS3 when it receives pulses $n$ in synchronism with the half write pulses of the RW wave forms.

While the principles of the invention have been described above in connection with specific apparatus, it is to be clearly understood that this description is made only by way of example and not as a limitation on the scope of the invention.

What we claim is:

1. Equipment for handling intelligence composed of alternative binary value intelligence bits, comprising a register provided with an array of bistable "ferric" cells storing according to their states a selected pattern of such intelligence bits, a first and second winding for each cell said first windings being in series, means for addressing the array of cells over said second windings means wired to the cells for addressing the array of cells with a cyclic wave pattern to operate the register for producing a time-sequence pattern of output pulses over said first windings representing the pattern of stored intelligence bits, and means for restoring the intelligence pattern to the array of cells including a feedback circuit common to the cell array and through which the time-sequence pattern of output pulses is fed back to the cell array over said first windings to coact with said cyclic wave pattern for rewriting the pattern over said first windings of intelligence bits into the cells.

2. Equipment as defined in claim 1, said array of cells being a tandem array addressed sequentially by said cyclic wave pattern for producing said time-sequence pattern of output pulses.

3. Intelligence storage equipment comprising an array of bistable "ferric" cells, a common conductor threading the cells, individual conductors respectively threading the cells and crossing the common conductor, each cell being operable from a first to a second stable state by a pair of half write pulses concurrently applied to the common conductor and to the individual conductor threading the cell and being reversible to the first state by a read pulse on the common conductor and thereupon producing an output pulse on its individual conductor, transfer devices of a delay type between successive individual conductors and between the last and first conductor, each transfer device responsive to an output pulse produced by a cell on one individual conductor for applying a half write pulse to the relatively next individual conductor, the common conductor being activated by successive read and half write pulses from a cyclic source for operating the cells to produce the output pulses and for combining with the half write pulses produced on the individual conductors to set the cells in said second state.

4. Intelligence storage equipment comprising a coordinate array of rows and columns of bistable "ferric" cells storing according to their states a selected pattern of binary value intelligence bits and each having a row wire in common with the cores in that row and a column wire in common with the cores in that column, column-to-column transfer devices and a last-to-first column transfer device, each column-to-column device having an input common to cells of one column and an output common to cells of a next column and the last-to-first column transfer device having an input common to the last column cells and an output common to the first column cells, means for pulsing the rows one after another with read and half write pulses at cyclic intervals to operate the cells of a row during a cyclic interval for advancing the state of each cell in the row except the last cell through the column-to-column transfer devices to next column cells in the same row during the latter cyclic interval and for transferring the state of the last cell in the row through the last-to-first column transfer device to a cell in the first column, the last-to-first column device including delay means for delaying transfer by one cyclic interval so as to cause the state of a last cell in a row to be advanced to the first cell of a next row being pulsed, whereby said pattern of intelligence bits stored in the array is maintained in circulation through the array.

5. Equipment as defined in claim 4, including a common output line for the array, a plurality of bistable devices respectively coupled to said transfer devices to be set thereby simultaneously according to the states of the cells of a row being pulsed, and means for sequentially operating said bistable devices, during the same cyclic interval in which the latter row is being pulsed, for applying successive output pulses, representative of the bits stored in this row, to said common output line.

6. Equipment as defined in claim 4, and an input line coupled to the first cells of all the rows of the array for applying entry pulses, representative of intelligence bits to be stored in the array, to said first cells at said cyclic intervals, each entry pulse being effective only upon the first cell of a row being pulsed by said pulsing means for establishing this first cell in a state for storing the intelligence bit represented by the applied entry pulse.

7. Intelligence storage equipment, as claimed in claim 2, in which the cyclic wave pattern is composed of read and half write pulses, and in which the feed back circuit comprises a time delay amplifier whose delay time is at least equal to the time difference between a read and a half write pulse.

8. Intelligence storage equipment, as claimed in claim 7, in which the feed back circuit further comprises a bistable device coupled to the time delay amplifier, a second time delay amplifier in series with the said bistable device, a second bistable device coupled to the said second time delay amplifier, a third time delay amplifier in series with the said second bistable device, activatable means for bypassing the series combination of said second bistable device and third time delay amplifier, and activatable means for bypassing the last mentioned series combination and the series combination of first bistable device and second time delay amplifier.

References Cited in the file of this patent

UNITED STATES PATENTS

| | | |
|---|---|---|
| 2,681,181 | Spencer | June 15, 1954 |
| 2,700,148 | McGuigan et al. | Jan. 18, 1955 |
| 2,719,965 | Person | Oct. 4, 1955 |
| 2,770,797 | Hamilton | Nov. 13, 1956 |
| 2,805,409 | Mader | Sept. 3, 1957 |
| 2,812,450 | Barney | Nov. 5, 1957 |
| 2,922,988 | Rosenthal | Jan. 26, 1960 |